Patented Oct. 21, 1924.

1,512,200

UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

FLUORESCENT SCREEN.

No Drawing. Application filed September 27, 1920. Serial No. 413,213.

*To all whom it may concern:*

Be it known that I, WHEELER P. DAVEY, a citizen of the United States, residing at Schenectady, in the county of Schenectady, State of New York, have invented certain new and useful Improvements in Fluorescent Screens, such, for example, as are used for intensifying purposes in radiography.

The present invention comprises an improvement in fluorescent screens, such, for example, as are used for intensifying purposes in radiography.

It is the object of my invention to provide a screen having a relatively hard, uniform surface capable of being cleansed by washing. One of the features of my invention comprises the process of forming a fluorescent screen at an elevated temperature.

In order to prepare a screen in accordance with my invention, a suitable fluorescent material, for example, calcium tungstate, is prepared in a state of suitable fineness,—say, fine enough to pass through a 200 mesh screen. Preliminary to the addition of a binder the fine powder is wet with any substance which will dissolve the binder. For example, when using a cellulose compound, I prefer to wet the powdered fluorescent material with acetone, amyl acetate, or methyl acetate. The wetted material is then added to a suitable solution of celluloid, or other cellulose compound which has been heated to about 45° C. Dirt and course particles preferably are removed by passing the mixture through a 200 mesh sieve.

The mixture is poured while still hot upon a suitable mold, consisting, for example, of a smooth or polished surface of suitable material, for example, glass, nickel, or silver, the mold preferably being at a temperature of about 45° C. The heated material spreads out into thin sheets forming the screen. Upon evaporation of the solvent the screen may be removed and used. For example, the hardened screen from which solvent has been removed by evaporation, may be placed in a bath of water. The water enters between the screen and the surface of the mold by capillarity and causes the screen to separate from the mold.

In the described manner, screens of desired thickness, say, 20 mils, may be produced having a hardness at the surface of at least about 1 on the mineral scale, being uniform, substantially impervious to water, and inert with respect to soap and alkali. Due to the hardness of their surface, screens made in accordance with my invention may be washed without surface abrasion or other injury. Radiographs prepared by the use of these screens are uniform and free from grain.

What I claim as new and desire to secure by Letters Patent of the United States is:—

1. The process of forming a fluorescent screen which consists in adding to a cellulose compound heated to about 45° C. powdered calcium tungstate moistened with a solvent for said cellulose compound, applying the resulting mixture to a smooth surface heated to about 45° C., allowing the layer thus formed to harden by evaporation of solvent and removing the hardened layer by the action of water.

2. The method of forming a hard, smooth, washable fluorescent screen which consists in pouring a mixture of a mineral fluorescent material, a binder of a celluloid compound, and an evaporable solvent into contact with a heated molding surface, allowing the mixture to harden by the evaporation of the solvent and detaching said layer when hardened by the action of a liquid.

3. The process of forming a fluorescent screen which consists in adding to a cellulose compound heated to a temperature materially above room temperature powdered calcium tungstate moistened with a solvent for said cellulose compound, applying the resulting mixture to a heated smooth surface, allowing the layer thus formed to harden by evaporation of solvent and removing the hardened layer by the action of water.

In witness whereof, I have hereunto set my hand this 25th day of September, 1920.

WHEELER P. DAVEY.